(12) United States Patent
Kaniöz (10) Patent No.: US 9,752,638 B2
(45) Date of Patent: Sep. 5, 2017

(54) ELECTROMECHANICAL SHOCK ABSORBER FOR WASHING MACHINES

(71) Applicant: AKSISTEM ELEKTROMEKANIK SANAYI VE TICARET LTD. STI., Gebze, Kocaeli (TR)

(72) Inventor: Adil Kaniöz, Kocaeli (TR)

(73) Assignee: AKSISTEM ELEKTROMEKANIK SANAYI VE TICARET LTD. STI., Gebze, Kocaeli (TR)

(*) Notice: Subject to any disclaimer, the term of this patent is extended or adjusted under 35 U.S.C. 154(b) by 0 days.

(21) Appl. No.: 14/655,926

(22) PCT Filed: Jan. 17, 2014

(86) PCT No.: PCT/EP2014/050897
§ 371 (c)(1),
(2) Date: Jun. 26, 2015

(87) PCT Pub. No.: WO2014/111517
PCT Pub. Date: Jul. 24, 2014

(65) Prior Publication Data
US 2015/0354653 A1 Dec. 10, 2015

(30) Foreign Application Priority Data
Jan. 21, 2013 (EP) .................................. 13152057

(51) Int. Cl.
*F16F 7/08* (2006.01)
*F16F 7/09* (2006.01)

(52) U.S. Cl.
CPC ................ *F16F 7/082* (2013.01); *F16F 7/09* (2013.01)

(58) Field of Classification Search
CPC ... F16F 7/095; F16F 7/09; F16F 7/082; D06F 37/20; F16D 49/10; F16D 49/02
(Continued)

(56) References Cited

U.S. PATENT DOCUMENTS 2,423,575 A * 7/1947 Beezley ................. F16D 65/46
188/77 R
2,435,754 A * 2/1948 Roth ....................... B66D 5/00
188/77 R (Continued)

FOREIGN PATENT DOCUMENTS

DE 102004047999 A1 4/2006
FR 1510030 A 1/1968
(Continued)

*Primary Examiner* — Melanie Torres Williams
(74) *Attorney, Agent, or Firm* — Epstein Drangel LLP; Robert L. Epstein (57) ABSTRACT

An electromechanical shock absorber (10) for dampening vibrations generated during rotation of the drum of a washing machine is disclosed. The absorber has a tubular body (11) and a piston (12) telescopically movable with respect to said tubular body (11). A first clamp (20) and a second clamp (21) are disposed within the tubular body (11) and are rotatably connected to each other at their first ends (20a, 2a). One or more friction elements (14) is located in between the piston (12) and the two clamps (20, 21) for producing, during operation, frictional dampening when said piston (12) moves telescopically with respect to the body (11). The body has a window (25) which is formed on said tubular body (11) and through which the second ends (20b, 21b) of the first and second clamps (20, 21) protrude outside said tubular body (11).

10 Claims, 5 Drawing Sheets

(58) Field of Classification Search
USPC ...... 188/381, 271, 272, 129, 68, 77 R, 77 W
See application file for complete search history.

(56) References Cited

U.S. PATENT DOCUMENTS

| | | | |
|---|---|---|---|
| 6,247,564 B1 * | 6/2001 | Kim | B60G 17/005 188/271 |
| 2006/0011429 A1 * | 1/2006 | Park | D06F 37/20 188/322.13 |

FOREIGN PATENT DOCUMENTS

| | | |
|---|---|---|
| GB | 2092261 A | 8/1982 |
| WO | 2011141770 A1 | 11/2011 |

* cited by examiner

ELECTROMECHANICAL SHOCK ABSORBER FOR WASHING MACHINES

The present invention relates to an electromechanical shock absorber for dampening vibrations in a washing machine. The shock absorber has an electric motor which changes the dampening force of the shock absorber in real time based on the instant rotational speed of the drum of a washing machine in a washing cycle.

WO 2011/141770 A1, owned by the present inventor, discloses an electromechanical shock absorber having an electric motor which changes the dampening force of the shock absorber using an electric motor for pulling two brake shoes together or spacing the same apart from each other. Two brake shoes and the motor are attached to a rigid bracket which keeps the elements integral on the body of the shock absorber. The two brake shoes are symmetric and they have rotational bearings for compensating the change of axis of a shaft occurring during the rotation of the shaft connecting the two bearings to each other. Furthermore, the shock absorber further comprises male coupling and a female coupling in order to compensate the change of primary axis of the shaft with respect to the primary axis of the electric motor. A drawback of the shock absorber disclosed in this document is explained in detail in the following paragraph.

According to this piece of prior art, a bracket is rigidly attached to the body of the shock absorber for keeping the brake shoes and the motor integral with the shock absorber. The fact that the actuation shaft of the shock absorber rotates for squeezing the two brake shoes towards each other requires that rotational joints shall be utilized at the ends of both brake shoes in order to compensate for the axial change of the actuation shaft. Furthermore, the coupling with the motor shall also be rotatable in order to compensate for the axial changes in between the motor output and the actuation shaft. Due to use of a rigid bracket attached on the body of the absorber, it is essential that rotational bearings shall be used not only in between the motor output shaft and the actuation shaft but also on the two ends of the brake shoes. This requirement however results in a bulky and expensive system which is subject to a relatively short service life due to high number of moving and rotating parts. Since the environmental conditions of the shock absorber in a washing machine is usually highly humid and subject to relatively high temperatures, the couplings in between the actuation shaft and the brake shoes and the motor output end are subject to accelerated wear in time. While in rare cases the actuation mechanism may get stuck due to temperature changes, it may be possible that the actuation components may get slack or loose in time due to high wear in between the rotational surfaces. As is well known, a washing cycle may take place from room temperature up to 90° C. and heat is transferred from the drum to the components such as the shock absorbers found in the vicinity of the drum. The change in the temperature inadvertently affects proper operation of the multiplicity of coupling elements found on the shock absorber of the prior art.

The simplified design of the electromechanical shock absorber of the present invention eliminates the need for a bracket to which multiple components are attached. Since these components are attached to each other using couplings for compensating the axial changes occurring during the squeeze or release steps of adjusting the dampening force of the absorber, the multiplicity of coupling elements are also avoided since the present invention proposes that the actuation motor can directly be installed on the piston through clamps and is movable within the peripheral limits of the window formed on the tubular body.

According to the present invention, an electromechanical shock absorber for dampening vibrations generated during rotation of the drum of a washing machine is disclosed. The absorber has a tubular body and a piston telescopically movable with respect to said tubular body. The absorber further comprises a first clamp and a second clamp disposed within the tubular body and rotatably connected to each other at their first ends. One or more friction elements is located in between the piston and the two clamps for producing, during operation, frictional dampening when said piston moves telescopically with respect to said body. A motor is attached to the second end of the second clamp and a squeeze nut is rotatably located in a bearing hole on the second end of the first clamp. An actuation shaft is attached to the motor at its first end and engages to the squeeze nut at its second end. The shock absorber distinguishingly comprises a window which is formed on said tubular body and through which the second ends of the first and second clamps protrude outside said tubular body such that the first and second clamps are installed directly on the piston and are movable with respect to each other within the peripheral limits of the window.

Either of the first or second clamps may have retaining walls for retaining a friction element and ribs for preventing rotation of said friction elements with respect to the piston. The second clamp is equipped, at its second end, with a motor holder for fixing the motor The actuation shaft is equipped with a limiter nut at its second end. The tubular body of the absorber may have one or more ventilation holes for evacuation of heated air generated during the frictional dampening.

The motor may be a step motor that divides a full rotation into a number of equal steps. The motor's position can then be commanded to move and hold at one of these steps without any feedback sensor (an open-loop controller), as long as the motor is carefully sized. Alternatively, the absorber may comprise a sensor for detecting the position of the first and second clamps with respect to each other. The shock absorber according to the present invention may also comprise a control circuitry in communication with the control circuitry of a washing machine for actuating the motor based on the rotational speed of a drum.

An object of the present invention is to provide an electromechanical shock absorber eliminating the drawbacks outlined in the background of the invention above.

Another object of the present invention is to provide an electromechanical shock absorber which is easy to manufacture and less costly.

A further object of the present invention is to provide an electromechanical shock absorber having a simplified structure with an increased service life. Therefore, the shock absorber is intended to have less number of moving or rotating parts and a simplified design which is less vulnerable to contingencies.

Accompanying drawings are given in simplified form solely for the purpose of exemplifying the present invention and cannot be considering as limiting the scope of protection defined in the appended claims.

FIG. 5 shows the perspective view of the body of the shock absorber, FIG. 6 shows the perspective view of the motor, FIG. 7 shows the perspective view of the squeeze nut Hereinafter, the present invention will be described in detail with reference to the accompanying drawings which are given solely for the purpose of exemplifying a shock absorber according to the present invention.

The present invention eliminates use of a bracket to which an electric motor coupled with an actuation shaft and two brake shoes were attached to the electromechanical shock absorber of the prior art. The use of a bracket caused major problems associated with the change of the primary axis of the actuation shaft and required use of a plurality of coupling elements in between the motor and the two brake shoes. Advantageously with the present invention, the motor is no longer fastened to a bracket which is mounted on the body of the shock absorber of the prior art.

Reference numerals used in the appended drawings are as follows;
10 Shock absorber
11 Body
12 Piston
13 Shaft
14 Friction element
15 Motor
16 Motor holder
17 Limiter nut
18 Squeeze nut
19 Retaining wall
20 First clamp
20a First end of the first clamp
20b Second end of the first clamp
21 Second clamp
21a First end of the second clamp
21b Second end of the second clamp
22 Ribs
23 Bearing hole
24 Cap
25 Window
25a First edge of window
25b Second edge of window
26 Ventilation hole The shock absorber (10) according to the present invention comprises a generally tubular body (11) and a piston (12) telescopically movable with respect to said tubular body. Each of the body (11) and the piston (12) has a bearing at its outer end for connection to the frame or to the drum of a washing machine as well known in the art. While the body and the piston moves telescopically with respect to each other, a friction element (14) produces the conventional dampening effect during the telescopic movement in between said body and said piston. Advantageously, the shock absorber (10) has an electric motor (15) which is adapted to change the normal friction force applied onto the friction element (14) during the telescopic movement of the body and the piston. The friction element (14) is normally retained in between the piston (12) and the first and second clamps (20,21). The two clamps (20,21) are encapsulated around their outer periphery within the body (11) of the shock absorber (10). While the outer diameter of the piston (12) is fixed, the tightness or the normal force producing the friction force is changed by the proximity of the first clamp (20) to the second clamp (21). To this end, an electric motor (15) is adapted to drive a shaft (13) which pulls the first clamp (20) and the second clamp (21) towards each other for tightening or which spaces them apart from each other for loosening the friction element (14).

Figures 1A, 1B:
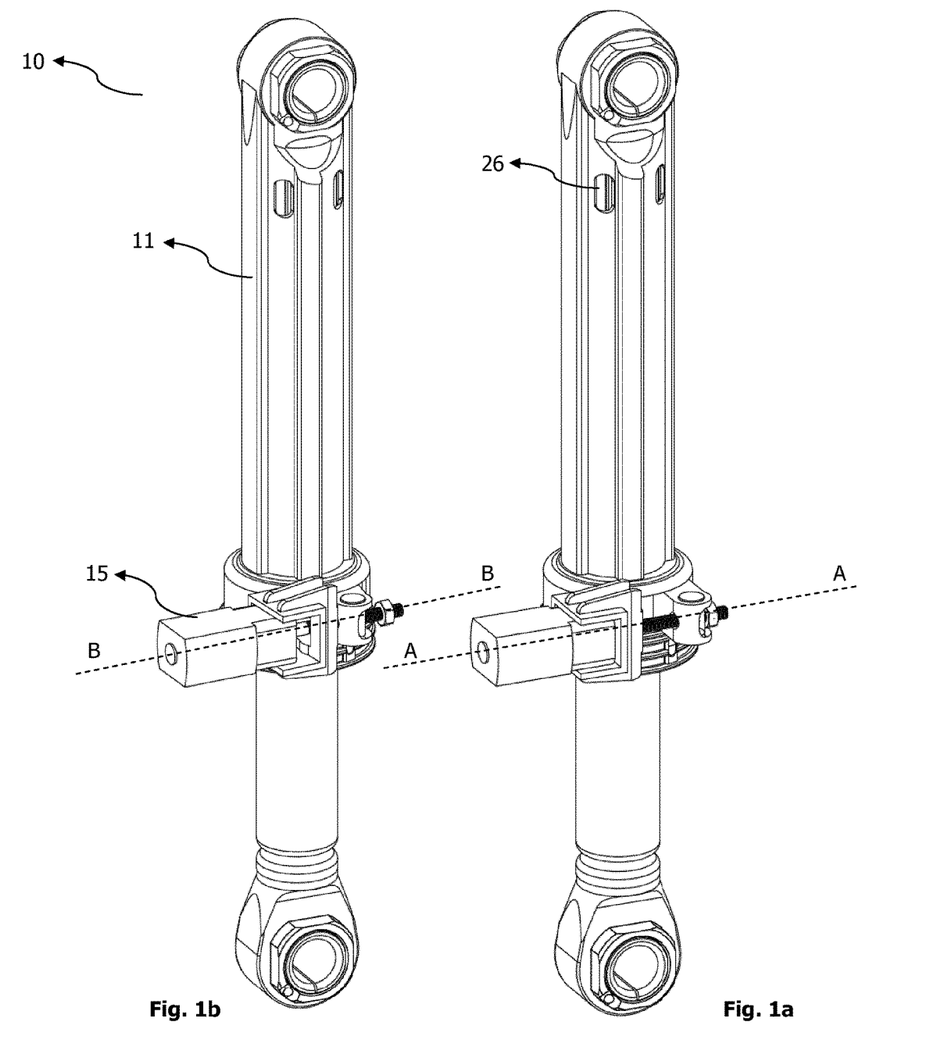
FIG. 1a shows perspective view of an electromechanical shock absorber in no-squeeze form according to the present invention.
FIG. 1b shows perspective view of an electromechanical shock absorber in a full-squeezed condition according to the present invention.
Figure 2A:
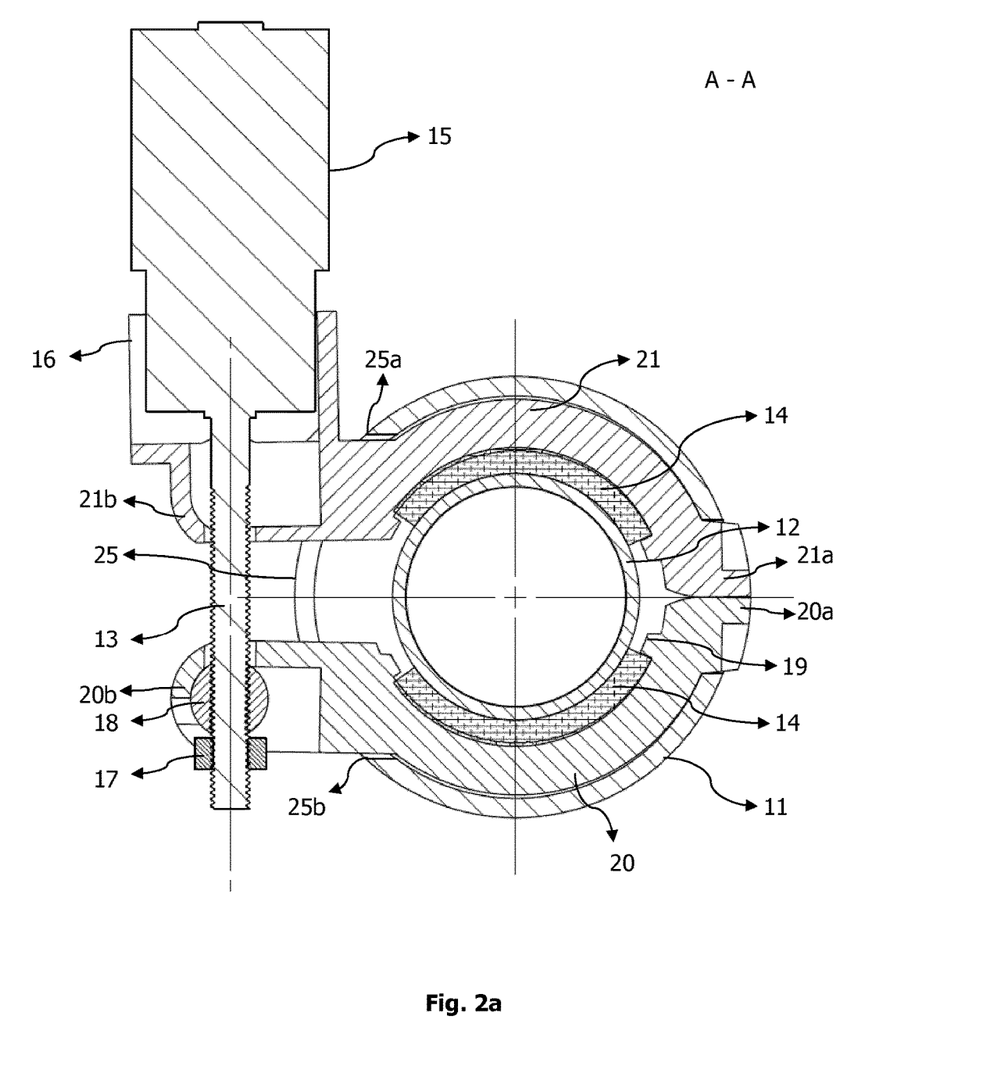
FIG. 2a shows the A-A cross sectional view of the electromechanical shock absorber in no-squeeze form according to FIG. 1a, FIG. 2b shows the B-B cross sectional view of the an electromechanical shock absorber in a fully squeezed condition according to FIG. 1b.

Perspective view of an electromechanical shock absorber is depicted in no-squeeze condition in FIG. 1a whereas the same is depicted in full-squeeze condition in FIG. 1b. The A-A cross sectional view of the electromechanical shock absorber in no-squeeze condition as shown to FIG. 1a is depicted in FIG. 2a. The semi-circular first clamp (20) is located within the body (11) and is attached to the second clamp (21) through its first end (20a). Likewise, the semi-circular second clamp (21) is located within the body (11) and is attached to the first clamp (20) through its first end (21a). Two separate friction elements (14) are retained within the two clamps (20,21) and the piston (12).

Figures 5, 6, 7:
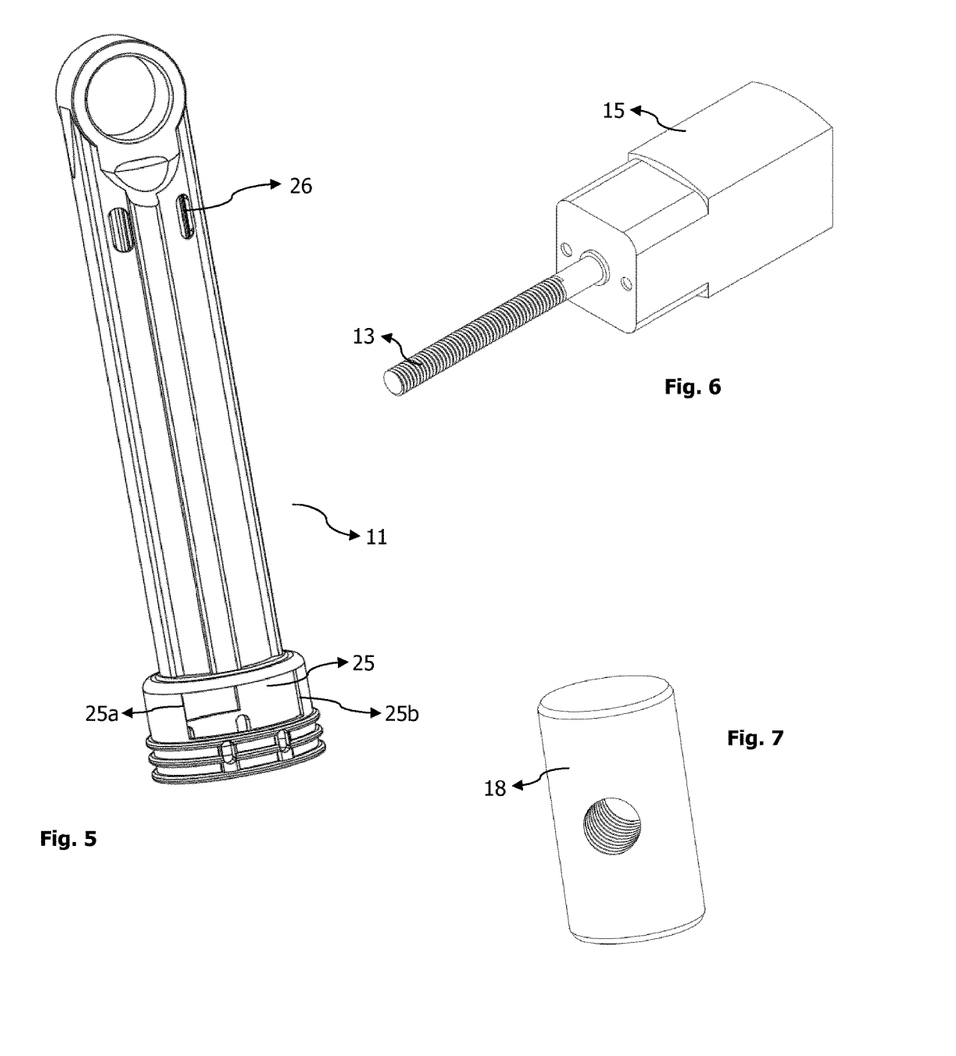

The first clamp (20) has a second end (20b) which has a bearing hole (23) within which a squeeze nut (18) is rotatably located. The squeeze nut (18) has inner threads for engagement with the outer threads of the actuation shaft (13). The first clamp (20) has two retaining walls (19) for retaining a friction element (14) in between the two walls. The squeeze nut (18), as shown in FIG. 7, has a cylindrical shape and has a cylindrical rotatable bearing (23) on the second end (20b) of the first clamp (20).

While the first end (21a) of the second clamp (21) is used for connection with the first end (20a) of the first clamp (20), the second clamp (21) has a second end (21b) which is equipped with a motor holder (16) for holding an electric motor (15) according to the present invention. Both of the second ends (20b, 21b) protrude outside the body (11) through a window (25) located on the body (11) of the shock absorber (20). The window (25) is defined by a first edge (25a) and a second edge (25b) along part of the outer periphery of the body (11) and is sized to accommodate the second ends (20b, 21b) of the first clamp (20) and the second clamp (21) when the electromechanical shock absorber is in no-squeeze condition as shown in FIG. 2a. The first and second edges (25a,25b) constitute the peripheral limits of the window (25). While the window (25) may be a rectangular window formed on the body (11) as shown in FIG. 5. its geometry is irrelevant as long as it allows access to the inner volume of the body (11) such that at least part of the first and second clamps (21,22) may protrude outside the generally cylindrical body (11) for connection of a motor (15) and an actuation shaft (13).

Figure 2B:
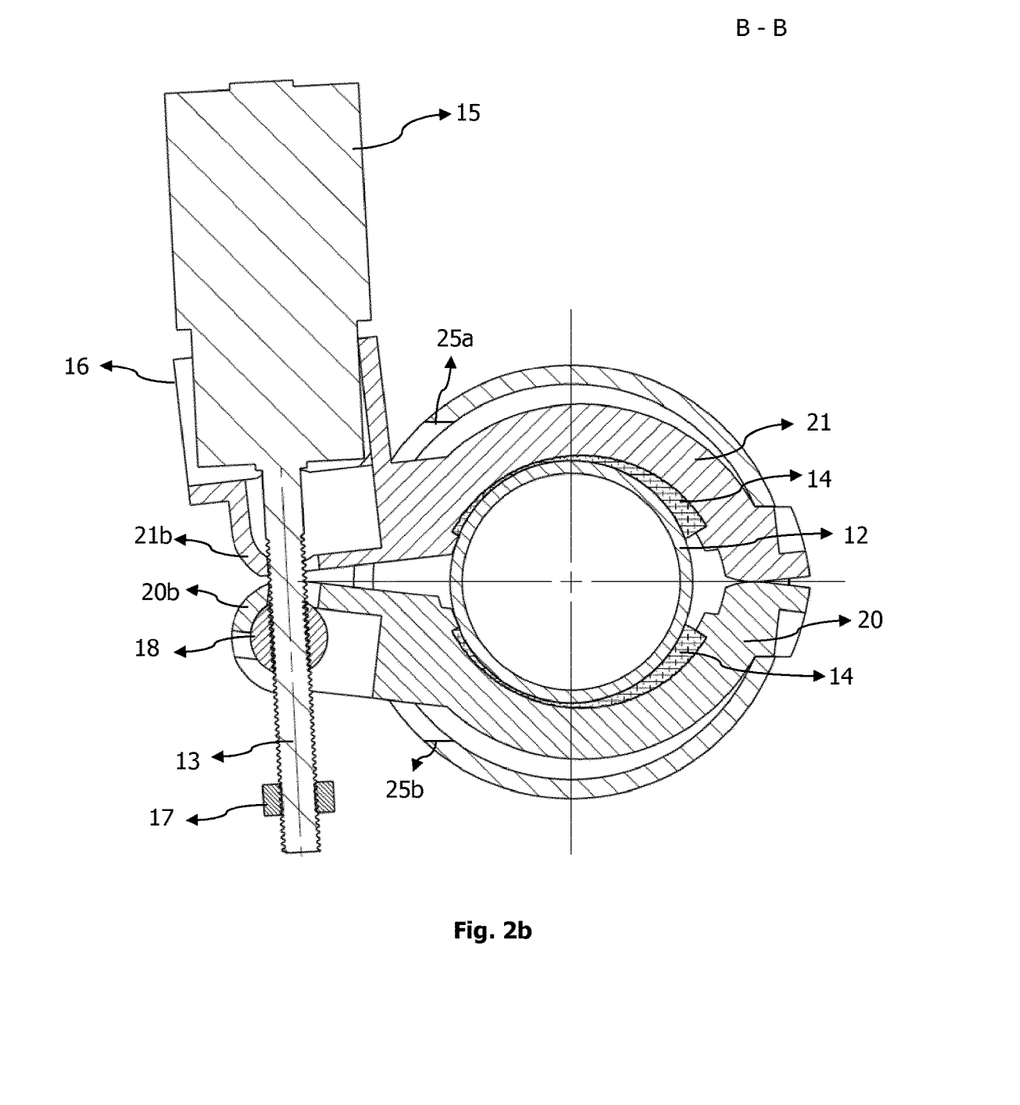
Figure 3A:
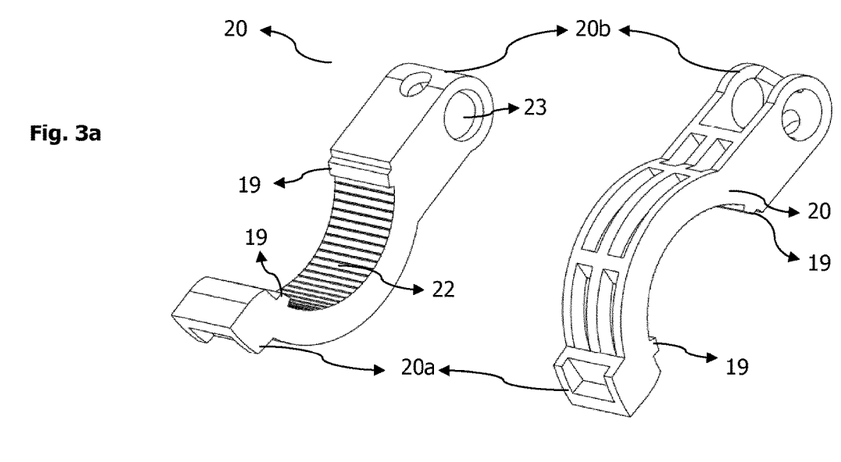
FIG. 3a shows the perspective view of the first squeeze clamp.
Figure 3B:
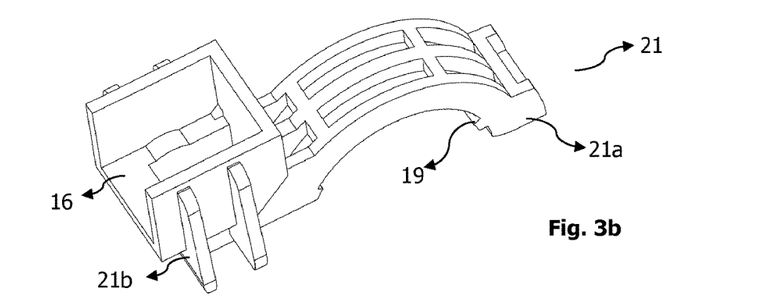
FIG. 3b shows the perspective view of the second squeeze clamp.

The B-B cross sectional view of an electromechanical shock absorber in a fully squeezed form according to FIG. 1b is depicted in FIG. 2b. A motor (15) is located in the motor holder (16) at the second end (21b) of the second clamp (21). As shown in FIG. 6, the motor (15) is directly connected to an actuation shaft (13) in the absence of rotational coupling means, which was used to be a requirement in the shock absorber of the prior art for compensating axial changes. The motor holder (16) retains the motor (15) in its place when the motor generates rotational movement and rotates the actuation shaft (13). The actuation shaft is connected to the cylindrical squeeze nut (18) located in the rotational bearing (23) on the second end (20b) of the first clamp (20). With the rotation of the actuation shaft (13), the first and second clamps (20,21) are pulled towards each other, resulting in squeezing the friction elements (14) retained in between the piston (12) and the two clamps (20,21). Once the two clamps (20,21) are fully squeezed as shown in FIG. 2a, the motor (15) is de-energized. In this condition, the shock absorber produces its highest frictional damping force and is useful at drum speeds typically under 400 rpm in conventional front loaded washing machines.

The actuation shaft (13) has a limiter nut (17) as shown in FIG. 2a and FIG. 2b. While both figures shows only one limiter nut at the outer end of the actuation shaft (13), installing two or more limiting nuts (17) at the outer end of the actuation shaft (13) would establish a more secure connection in between the shaft (13) and the nut (17). The limiter nut (17) may be used to adjust the maximum slack or gap in between the two clamps (20,21). The maximum slack in between the two clamps may either correspond to a "no-squeeze" condition as shown in FIG. 2a, whereas it may be set to a some squeeze condition, the extent of which depending on the location of the limiter nut (17) in the longitudinal direction of the actuation shaft (13). Once the limiter nut (17) is set at a desired position on the actuation shaft (13), it shall be fixed in its position using e.g. a second limiter nut, spring clips, rivets, snaps, adhesives, etc.

Figure 4:
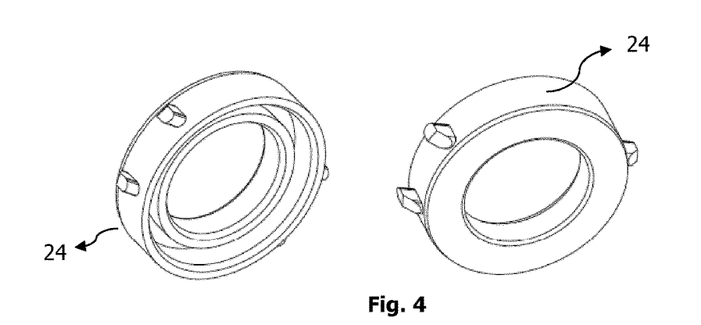
FIG. 4 shows the perspective view of the cap for closing the body of the shock absorber.

The first clamp (20) and the second clamp (21) has a generally a semi-circular part in between their first ends (20a, 21a) and their second ends (20b,21b). These semi-circular parts correspond to a location surrounding the piston (12) and have ribs (22) for preventing dislocation and/or rotation of friction elements (14) with respect to the piston (12). Each of the semi-circular parts of the first clamp (20) and the second clamp (21) are equipped with two retaining walls (19) for retaining a friction element (14) among the walls (19). A cap as shown in FIG. 4 is attached to the lower end of the body (11) as shown in FIG. 5 for closing the peripheral gap in between the piston (12) and the body (11).

The distance in between the second ends (20b,21b) of the two clamps (20,21) is an indication of how much the friction elements (14) are squeezed and therefore, of the instant dampening force of the shock absorber (10). Rotation of the actuation shaft (13) may be counted by an electronic counter for detecting the instant dampening force of the shock absorber (10) as the dampening force changes depending on the degree of tightness of the two clamps (20,21). Alternatively, a sensor may be used for detecting the distance in between the second ends (20b,21b) of the two clamps (20,21) revealing the degree on how much the two clamps are squeezed. The electromechanical shock absorber (10) may have a control circuitry and software for activating the motor (15) based on the instant need of the washing machine. In this case the control circuitry shall be in communication with the control circuitry of the washing machine and be energized by the washing machine. Alternatively, the electromechanical shock absorber (10) according to the present invention may directly be operated by the control circuitry of the washing machine.

The invention claimed is:

1. An electromechanical shock absorber for dampening vibrations generated during rotation of drum of a washing machine, said absorber comprising:
   a tubular body and a piston telescopically movable with respect to said tubular body,
   a first clamp and a second clamp disposed within the tubular body and rotatably connected to each other at their first ends,
   one or more friction elements located in between the piston and the two clamps for producing, during operation, frictional dampening when said piston moves telescopically with respect to said body,
   a motor directly installed on the second end of said second clamp,
   a cylindrical squeeze nut rotatably located in a bearing hole on the second end of the first clamp,
   an actuation shaft attached to said motor at its first end and engaged to the squeeze nut at its second end,
   wherein the shock absorber further comprises a window which is formed on said tubular body and through which the second ends of the first and second clamps protrudes outside said tubular body such that the first and second clamps are installed directly on the piston and are movable with respect to each other within the peripheral limits of said window, and
   wherein said second clamp is equipped, at its second end, with a motor holder for fixing said motor.

2. An electromechanical shock absorber according to claim 1 wherein either of the first or second clamps have retaining walls for retaining a friction element.

3. An electromechanical shock absorber according to claim 1 wherein either of the first or second clamps have ribs for preventing rotation of said friction elements with respect to the piston.

4. An electromechanical shock absorber according to claim 1 wherein the actuation shaft is equipped with a limiter nut at its second end.

5. An electromechanical shock absorber according to claim 1 wherein the tubular body has one or more ventilation holes for evacuation of heated air generated during the frictional dampening.

6. An electromechanical shock absorber according to claim 1 wherein the motor is a step motor.

7. An electromechanical shock absorber according to claim 1 wherein the absorber further comprises a sensor for detecting the position of the first and second clamps with respect to each other.

8. An electromechanical shock absorber according to claim 1 wherein the absorber further comprises control circuitry in communication with the control circuitry of a washing machine for actuating the motor based on the rotational speed of a drum.

9. An electromechanical shock absorber according to claim 1 for use with a washing machine, said electromechanical shock absorber further comprising means for attaching said electromechanical shock absorber to the washing machine.

10. An electromechanical shock absorber for dampening vibrations generated during rotation of drum of a washing machine, said absorber comprising:
   a tubular body and a piston telescopically movable with respect to said tubular body,
   first and second clamps, each having a first end and a second end, said clamps being disposed within the tubular body and rotatably connected to each other at said first end,
   one or more friction elements located in between the piston and said clamps for producing, during operation, frictional dampening when said piston moves telescopically with respect to said body,
   a motor directly installed on said second end of said second clamp without intervening elements,
   a cylindrical squeeze nut rotatably located in a bearing hole on the second end of the first clamp, an actuation shaft extending from said motor and engaged to the squeeze nut, and a window which is formed on said tubular body and through which the second ends of the first and second clamps protrude outside said tubular body such that the first and second clamps are installed directly on the piston and are movable with respect to each other within the peripheral limits of said window.

\* \* \* \* \*